US011940888B2

United States Patent
Ghosh et al.

(10) Patent No.: US 11,940,888 B2
(45) Date of Patent: *Mar. 26, 2024

(54) TECHNOLOGY TO PROVIDE FAULT TOLERANCE FOR ELLIPTIC CURVE DIGITAL SIGNATURE ALGORITHM ENGINES

(71) Applicant: Intel Corporation, Santa Clara, CA (US)

(72) Inventors: Santosh Ghosh, Hillsboro, OR (US); Marcio Juliato, Portland, OR (US); Manoj R. Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 17/447,600

(22) Filed: Sep. 14, 2021

(65) Prior Publication Data

US 2022/0083439 A1 Mar. 17, 2022

Related U.S. Application Data (63) Continuation of application No. 16/199,383, filed on Nov. 26, 2018, now Pat. No. 11,151,007.

(51) Int. Cl.
*G06F 11/27* (2006.01)
*G06F 11/22* (2006.01)
*H04L 9/00* (2022.01)
(Continued)

(52) U.S. Cl.
CPC .......... *G06F 11/27* (2013.01); *G06F 11/2236* (2013.01); *H04L 9/004* (2013.01);
(Continued)

(58) Field of Classification Search
CPC .... G06F 11/27; G06F 11/2236; H04L 9/3066; H04L 9/3252
See application file for complete search history.

(56) References Cited

U.S. PATENT DOCUMENTS

2010/0037069 A1* 2/2010 Deierling ................ G06F 21/79
713/193
2014/0281554 A1* 9/2014 Maletsky .............. H04L 9/3268
713/175
(Continued)

OTHER PUBLICATIONS

Charette, "This Car Runs on Code", Feb. 1, 2009, 5 pages, https://spectrum.ieee.org/transportation/systems/this-car-runs-on-code.
(Continued)

*Primary Examiner* — Jigar P Patel
(74) *Attorney, Agent, or Firm* — JAFFERY WATSON MENDONSA & HAMILTON LLP (57) ABSTRACT

A data processing system includes technology for detecting and tolerating faults. The data processing system comprises an electronic control unit (ECU) with a processing core and a fault-tolerant elliptic curve digital signature algorithm (ECDSA) engine. The fault-tolerant ECDSA engine comprises multiple verification state machines (VSMs). The data processing system also comprises nonvolatile storage in communication with the processing core and ECU software in the nonvolatile storage. The ECU software, when executed, enables the data processing system to operate as a node in a distributed data processing system, including receiving digitally signed messages from other nodes in the distributed data processing system. The ECU further comprises a known-answer built-in self-test unit (KA-BISTU). Also, the ECU software comprises fault-tolerant ECDSA engine (FTEE) management software which, when executed by the processing core, utilizes the KA-BISTU to periodically test the fault-tolerant ECDSA engine for faults. Other embodiments are described and claimed.

15 Claims, 5 Drawing Sheets

(51) Int. Cl.
*H04L 9/30* (2006.01)
*H04L 9/32* (2006.01)
(52) U.S. Cl.
CPC .......... *H04L 9/3066* (2013.01); *H04L 9/3252* (2013.01); *H04L 2209/84* (2013.01)

(56) References Cited

U.S. PATENT DOCUMENTS

| | | | | |
|---|---|---|---|---|
| 2015/0074422 | A1* | 3/2015 | Meyer | H04L 9/3066 |
| | | | | 713/189 |
| 2015/0350171 | A1* | 12/2015 | Brumley | H04L 63/0876 |
| | | | | 713/176 |
| 2017/0188231 | A1* | 6/2017 | Nix | H04W 12/40 |
| 2018/0299509 | A1* | 10/2018 | Baker | G06F 1/06 |
| 2019/0281028 | A1* | 9/2019 | Gillan | H04L 63/0861 |

OTHER PUBLICATIONS

Dominguez-Oviedo, et al., "Error Detection and Fault Tolerance in ECSM Using Input Randomization", IEEE Transactions on Dependable and Secure Computing, 13 pages, vol. 6, Issue: 3, Jul.-Sep. 2009, https://ieeexplore.ieee.org/stamp/stamp.jsp?tp=&amnumber-4479492.

"Automotive Safety Integrity Level" Jul. 13, 2018, 5 pages, Wikipedia, https://en.wikipedia.org/wiki/Automotive_Safety_Integrity_Level.

"Elliptic Curve Digital Signature Algorithm" Oct. 5, 2018, 6 pages, Wikipedia, https://en.wikipedia.org/wiki/Elliptic_Curve_Digital_Signature_Algorithm.

"Elliptic-curve cryptography" Oct. 5, 2018, 10 pages, Wikipedia, https://en.wikipedia.org/wiki/Elliptic-curve_cryptography.

"Single event upset" Oct. 7, 2018, 4 pages, Wikipedia, https://en.wikipedia.org/wiki/Single_event_upset.

"Finite field" Oct. 10, 2018, 7 pages, Wikipedia, https://en.wikipedia.org/wiki/Finite_field.

Madhuri, et al., "Design and Implementation of Arithmetic Unit for GF(2m)" Nov. 2012, 7 pages, International Journal of Advanced Research in Computer Engineering & Technology (IJARCET) vol. 1, Issue 9.

* cited by examiner

000
TECHNOLOGY TO PROVIDE FAULT TOLERANCE FOR ELLIPTIC CURVE DIGITAL SIGNATURE ALGORITHM ENGINES

CROSS-REFERENCE TO RELATED APPLICATIONS

This patent application is a continuation of U.S. patent application Ser. No. 16/199,383, filed Nov. 26, 2018, the content of which is hereby incorporated by reference.

TECHNICAL FIELD

The present disclosure pertains in general to data processing systems and in particular to computer security.

BACKGROUND

When different data processing systems communicate with each other, there is a risk that those communications may get altered. Even within a single data processing system, communications between components might get altered. Such alterations may be caused by malevolent forces (e.g., a computer software virus or an unauthorized hardware probe) or by natural causes, such as random communication faults.

One way to guard against alteration of a message is for the source of the message to digitally sign the message. The message recipient may then check the digital signature to determine whether or not the message has been altered. In other words, the recipient may use the digital signature to verify the integrity of the message. The digital signature also allows the recipient to verify that the message was sent by the expected source. In other words, the digital signature allows the recipient to verify the identity of the sender.

One popular method for digitally signing messages is known as the "elliptic curve digital signature algorithm" (ECDSA). To generate and verify ECDSA digital signatures, a data processing system may use an ECDSA engine that includes a finite field (FF) arithmetic logic unit (ALU). An FF is a field that contains a finite number of elements. For instance, an example FF may be defined as the set of integers resulting from the formula of "integers mod P", where P is a prime number. An FF may also be referred to as a "Galois field," in recognition of the French mathematician Évariste Galois.

However, one challenge associated with using ECDSA digital signatures is the risk of computational error when executing cryptographic algorithms or circuits when generating or verifying a digital signature. For instance, computational errors may be caused by temperature changes, electromagnetic interference, electrical noise, hardware failures, etc. If the sender of a message suffers from a computational error when generating the digital signature, the recipient may conclude that the digital signature is invalid, even though the message was not altered and was sent by the expected sender. Similarly, if the recipient of a message suffers from a computational error when verifying the digital signature, the recipient may erroneously conclude that the digital signature is invalid, even though the message was not altered and was sent by the expected sender. And if a recipient concludes that a message has an invalid digital signature, the recipient typically rejects that message.

Erroneous digital signature computations may have serious consequences. For instance, it the field of autonomous vehicles, a driving assistance system in a vehicle may include numerous different nodes which communicate by sending messages with ECDSA digital signatures over a controller area network (CAN). Those messages may include important data concerning the current state of the vehicle and the surrounding environment. If one or more nodes were to reject one or more messages due to erroneous digital signature computations, the results could be dangerous. As another example, erroneous digital signature computations may involve vehicle-to-anything (V2X) messages, which are message between a driving assistance system in a vehicle and another data processing system, whether that data processing system is in a different vehicle or in a stationary structure. As indicated below, erroneous digital signature computations may also affect messages in many other types of systems, such as systems for managing nuclear power generation, aerospace systems, etc.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

For purposes of this disclosure, a digital signature may be referred to simply as a signature. An ECDSA signature for a message "m" is a pair of integers "(r, s)" that has been generated by the sender, based on the following:

a hash "e" of the message "m"; e.g., e=HASH(m), where HASH is a cryptographic hash function;
a private key integer "$d_A$";
a predetermined elliptic curve equation and the corresponding elliptic curve field;
an elliptic curve base point "G"; and
the integer "n" that is the integer order of G, in that [n]G=O, where O is the identity element, and where "[n]G" denotes elliptic curve point multiplication of the point G by the scalar n.

The sender generates the private key $d_A$ by randomly selecting a value from the interval [1, n−1]. The sender then uses $d_A$ to generate the curve point Q=[$d_A$]G. Q then serves as the public key. The sender also uses another random number "k" to generate another point on the curve, and the sender uses that point to generate r. The sender also uses k to generate s.

To verify the signature, the recipient uses s from the signature and the public key Q (and other values) to calculate a curve point "($x_1$, $y_1$)." The recipient then determines whether r=$x_1$ mod n. If it does, the signature is considered valid. If it does not the signature is considered invalid. In addition, the recipient may perform other checks in addition to or instead of comparing r and $x_1$, and the recipient may consider the signature to be invalid if any of those checks fail.

Additional details on ECDSA signature generation and verification may be found below and under the entry for "Elliptic Curve Digital Signature Algorithm" on the website known by the name or trademark of Wikipedia.

Senders and recipients may use ECDSA engines to generate and verify ECDSA signatures. As indicated above, one challenge associated with using ECDSA signatures is the risk of computational error when generating or verifying a signature. Such computational errors may be referred to as faults. Also, such faults may be temporary or permanent. Temporary faults may also be referred to as "transient faults." Permanent faults are faults which persist despite a reboot of the ECU. Transient faults may persist for different periods of time. For purposes of this disclosure, a transient fault that does not last longer than one signature generation or verification process may be referred to as a "short transient fault," and a transient fault that lasts longer than one signature generation or verification process may be referred to as a "long transient fault." A short transient fault may also be referred to as a "single-event transient" (SET). SETs may happen, for instance, in reset and clock lines. SETs may also interfere with elements of a digital circuit (e.g., by turning a transistor on or off). When a SET interferes with digital logic and the effects are registered or stored in storage elements of sequential circuits, the SET may be referred to as a single-event upset (SEU). Signature generation and verification processes may also be subject to multiple-event upsets (MEUs).

The present disclosure describes technology to provide fault tolerance for ECDSA engines. In addition, the technology described herein may be used to provide fault detection for ECDSA engines.

Figure 1:
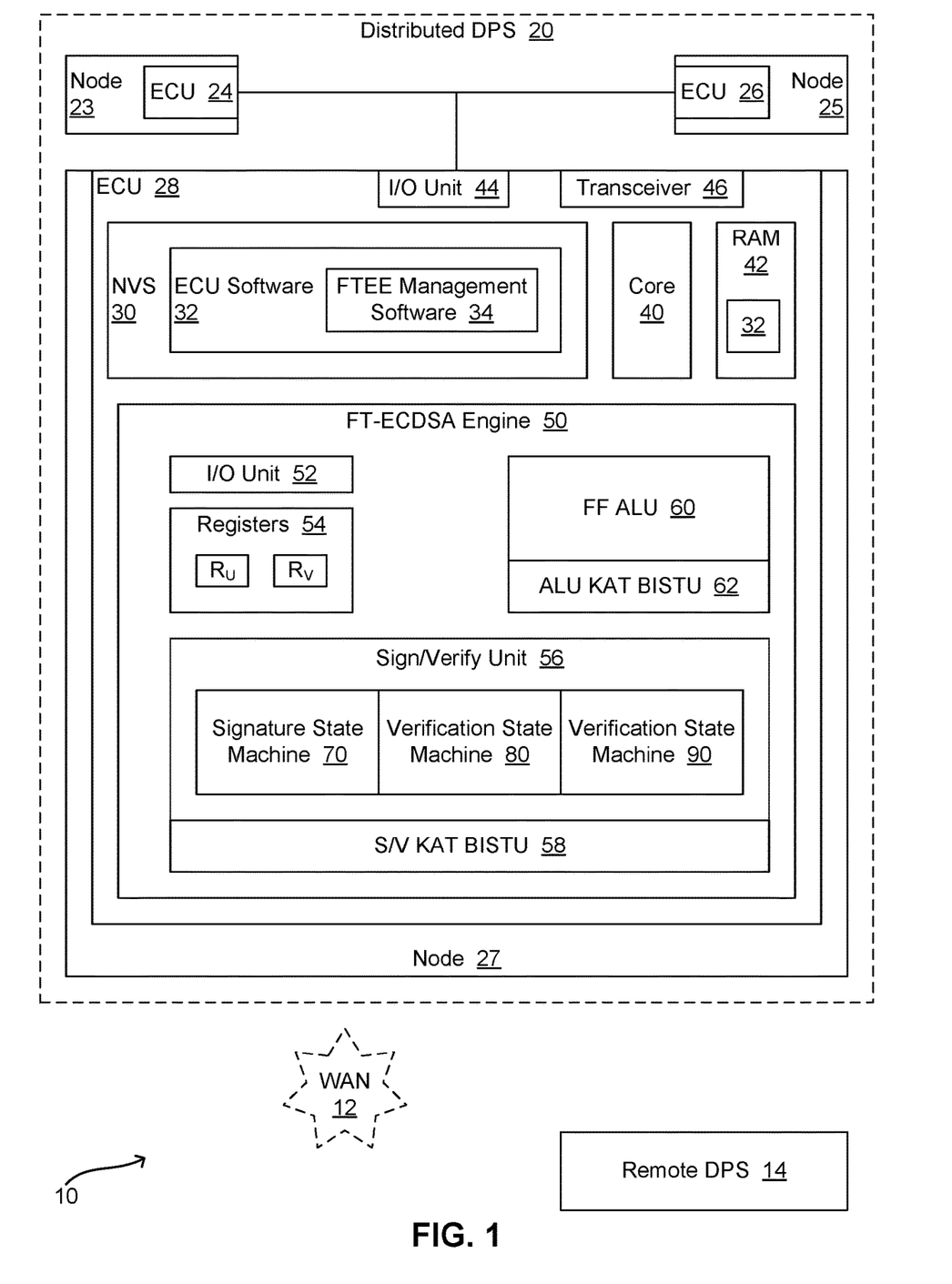
FIG. 1 is a block diagram of an example embodiment of a data processing environment including a node with a fault-tolerant ECDSA engine.

FIG. 1 is a block diagram of an example embodiment of a data processing environment 10 including a node 27 with a fault-tolerant ECDSA (FT-ECDSA) engine 50. In particular, for purposes of illustration, node 27 is illustrated as part of a distributed data processing system 20, along with other nodes, such as node 23 and node 25. For purposes of this disclosure, the nodes within distributed data processing system 20 may be referred to as "local nodes." The local nodes may communicate with each other via a local area network (LAN) (e.g., using a controller area network (CAN) bus and/or any other suitable wired or wireless communication protocol or combination of protocols).

In one embodiment, distributed data processing system 20 is a driving assistance system in a vehicle, and each of nodes 23, 25, and 27 is designed to serve a different purpose within the driving assistance system. For instance, node 23 may be a GPS unit which generates messages pertaining to the current location of the vehicle, node 25 may be a brake management unit which generates messages pertaining to the operational status of the vehicle's brakes (e.g., whether the brakes are being applied), and node 27 may be a vehicle management node which receives messages from nodes 23 and 25, determines what kinds of actions (if any) are desired to be taken based on those messages (e.g., applying the brakes), and sends messages to one or more nodes (e.g., node 25) to cause that node (or those nodes) to take the desired actions.

As illustrated, data processing environment 10 may also include one or more remote nodes, such as a remote data processing system (DPS) 14. Distributed data processing system 20 may communicate with remoted nodes such as remote data processing system 14 via a wide area network (WAN) 12 or a combination of networks. For instance, remote DPS 14 may be a roadside unit that sends messages regarding traffic conditions to distributed data processing system 20. In addition or alternatively, remote DPS 14 may send over-the-air (OTA) updates to distributed data processing system 20, to update the software in one or more of the nodes in distributed data processing system 20. Distributed data processing system may also send messages to remoted DPS 14. For instance, node 27 may notify remote DPS 14 about the current speed and heading of the vehicle that is being managed by distributed data processing system 20. Messages between driving assistance systems in different vehicles may be referred to as "vehicle-to-vehicle" (V2V) messages. Also, as indicated above, messages between the driving assistance system in a vehicle and another data processing system, whether that data processing system is in a vehicle or in a stationary structure, may be referred to as "vehicle-to-anything" (V2X) messages. All of the internal messages between nodes in a distributed data processing system and all of the V2X messages may include ECDSA signatures.

In other embodiments, a distributed data processing system may include a lesser or greater number of local nodes, and a data processing environment may include multiple distributed data processing systems and multiple remote data processing systems which communicate with one or more of those distributed data processing systems. Also, data processing systems with fault-tolerant ECDSA engines according to the present disclosure are not limited to driving assistance systems, but may be used in a wide variety of applications. For instance, a factory may include a manufacturing system with multiple nodes that include fault-tolerant ECDSA engines, a warehouse may include a product management system with multiple nodes that include fault-tolerant ECDSA engines, etc.

Referring again to the embodiment of FIG. 1, as illustrated, node 27 includes an ECU 28, and ECU 28 includes FT-ECDSA engine 50 in communication with a processing core 40. For purposes of this disclosure, a processing core may be referred to simply as a "core." ECU 28 also includes nonvolatile storage (NVS) 30 and random access memory (RAM) 42 in communication with core 40. NVS 30 include ECU software 32, and ECU software 32 includes FT-ECDSA engine (FTEE) management software 34. Core 40 may copy ECU software from NVS 30 to RAM 42 for execution. Software such as ECU software 32 may also be referred to as "firmware." As described in greater detail below, in the embodiment of FIG. 1, FTEE management software 34 causes node 27 to perform operations which enable ECU 28 to detect and tolerate faults in FTEE 50.

ECU 28 may also include an input/output (I/O) unit 44 in communication with core 40 for communicating with other local nodes and a transceiver 46 in communication with core 40 for communicating with remote data processing systems. Alternatively, a transceiver may reside outside of an ECU in a node. In some embodiments, nodes may use network interface controllers (NICs) as I/O units for communicating with other local or remote systems. Also, in the embodiment of FIG. 1, node 23 includes an ECU 24, and node 25 includes an ECU 26. In one embodiment, the ECU in each node includes some or all of the features depicted in ECU 28 and/or similar features. Nodes may also include any additional components that are suitable for the intended application. For instance, node 27 may also include various other hardware components in communication (directly or indirectly) with core 40.

As illustrated, FT-ECDSA engine 50 includes an I/O unit 52, a set of registers 54, a sign/verify unit 56, and an FF ALU 60. Sign/verify unit 56 includes a signature state machine (SSM) 70 and two verification state machines (VSMs) 80 and 90. SSM 70 uses FF ALU 60 to generate ECDSA signatures.

In one embodiment, sign/verify unit 56 uses both VSM 80 and VSM 90 to verify each ECDSA signature. Thus, sign/verify unit 56 provides for signature verification redundancy. Moreover, in one embodiment, the set of processing resources that VMS 80 uses to verify signatures is different from the set of processing resources that VSM 90 uses. In particular, VSMs 80 and 90 both use FF ALU 60 to verify signatures, but VMS 80 uses at least one processing resource that VSM 90 does not use, and VSM 90 uses at least one processing resource that VSM 80 does not use. For instance, as described in greater detail below with regard to block 210 of FIG. 3B, in one embodiment, VMS 80 implements scalar multiplication, whereas VMS 90 implements multi-scalar multiplication. Accordingly, VMS 80 may be referred to as a "scalar multiplication module," and VMS 90 may be referred to as a "multi-scalar multiplication module." Also, VSM 80 may use a particular register (e.g., "$R_U$") to output the result of its signature verification, and VSM 90 may use another register (e.g., "$R_V$") to output its result.

In addition, FT-ECDSA engine 50 includes an ALU known-answer test (KAT) built-in self-test unit (BISTU) 62 and a sign/verify (S/V) KAT BISTU 58. As described in greater detail below, core 40 uses ALU KAT BISTU 62 to test FF ALU 60 for faults, and core 40 uses S/V KAT BISTU to test sign/verify unit 56 for faults.

Figure 2:
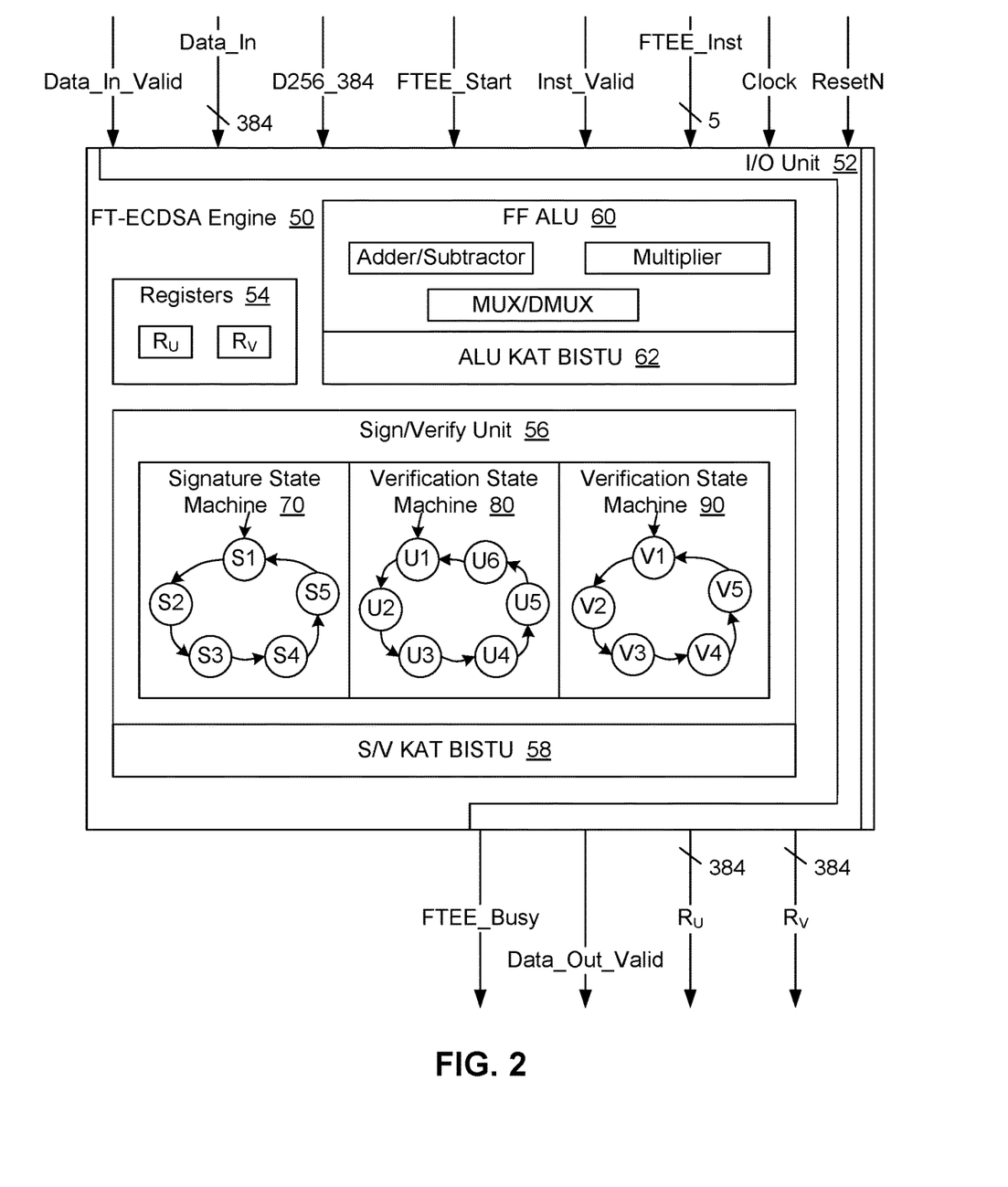
FIG. 2 is a block diagram illustrating the fault-tolerant ECDSA engine of FIG. 1 in greater detail.

FIG. 2 is a block diagram illustrating FT-ECDSA engine 50 in greater detail. For instance, FIG. 2 illustrates that VSM 80 and VSM 90 use different techniques for verifying messages, as described in greater detail below. FIG. 2 also shows various input lines to and output lines from FT-ECDSA engine 50. As illustrated, those lines may be provided or supported by I/O unit 52. FIG. 2 also shows various different electronic circuits within FF ALU 60 for performing various different types of operations, such as an "ADDER/SUBTRACTOR" circuit to perform addition and subtraction, a "MULTIPLIER" circuit to perform scalar multiplication, and a "MUX/DMUX" circuit to perform multiplexing and demultiplexing. For purposes of this disclosure, each different electronic circuit may be referred to as a "module" or a "processing structure."

As indicated above, sign/verify unit 56 includes two VSMs, 80 and 90. In other words, sign/verify unit 56 includes dual modular redundancy (DMR) for the VSM module.

Figure 3A:
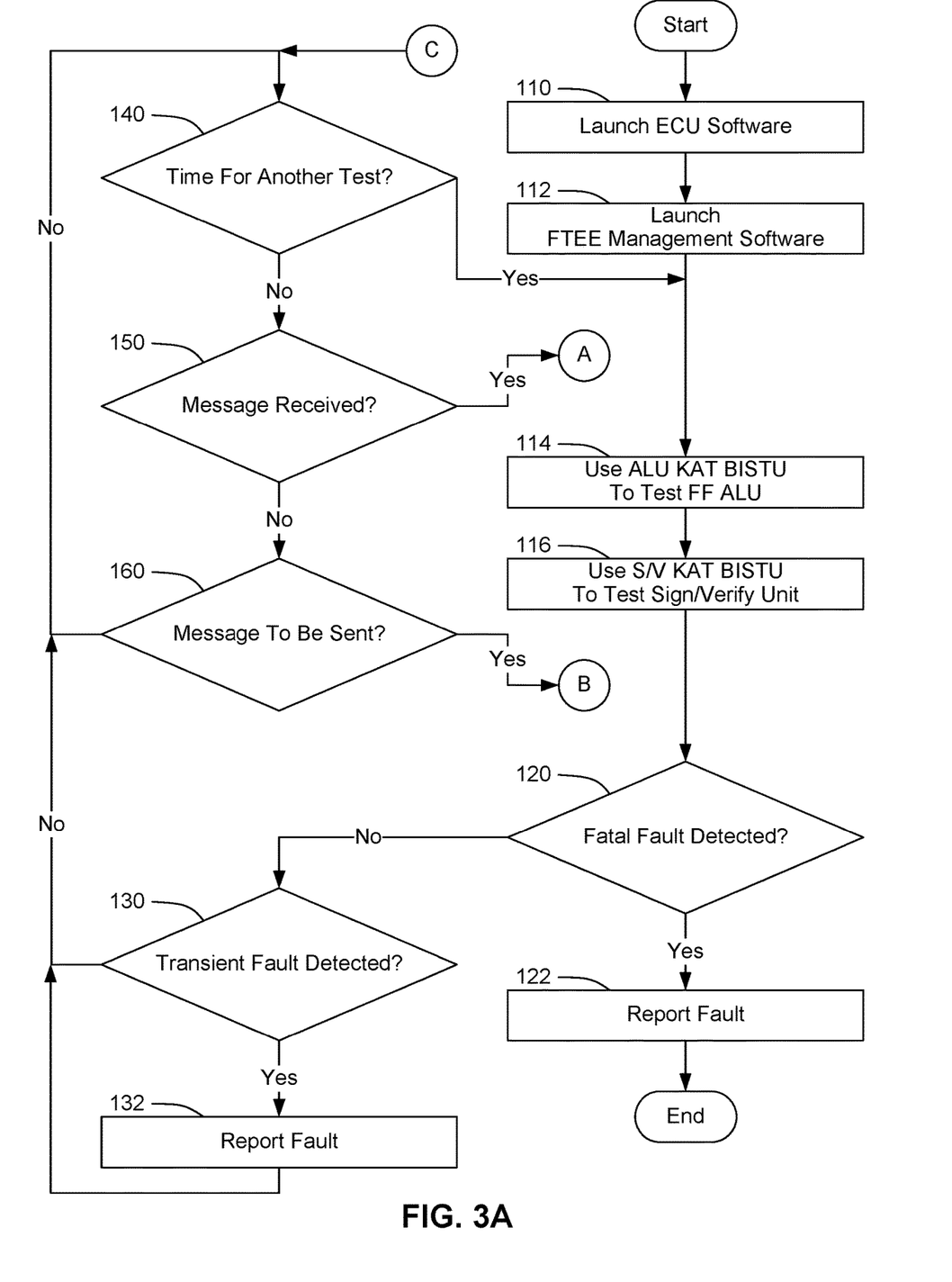
FIGS. 3A-3C present a flowchart of an example embodiment of a process for detecting and tolerating faults in an ECDSA engine, with FIG. 3B focused primarily on signature verification and FIG. 3C focused primarily on signature generation.
Figure 3B:
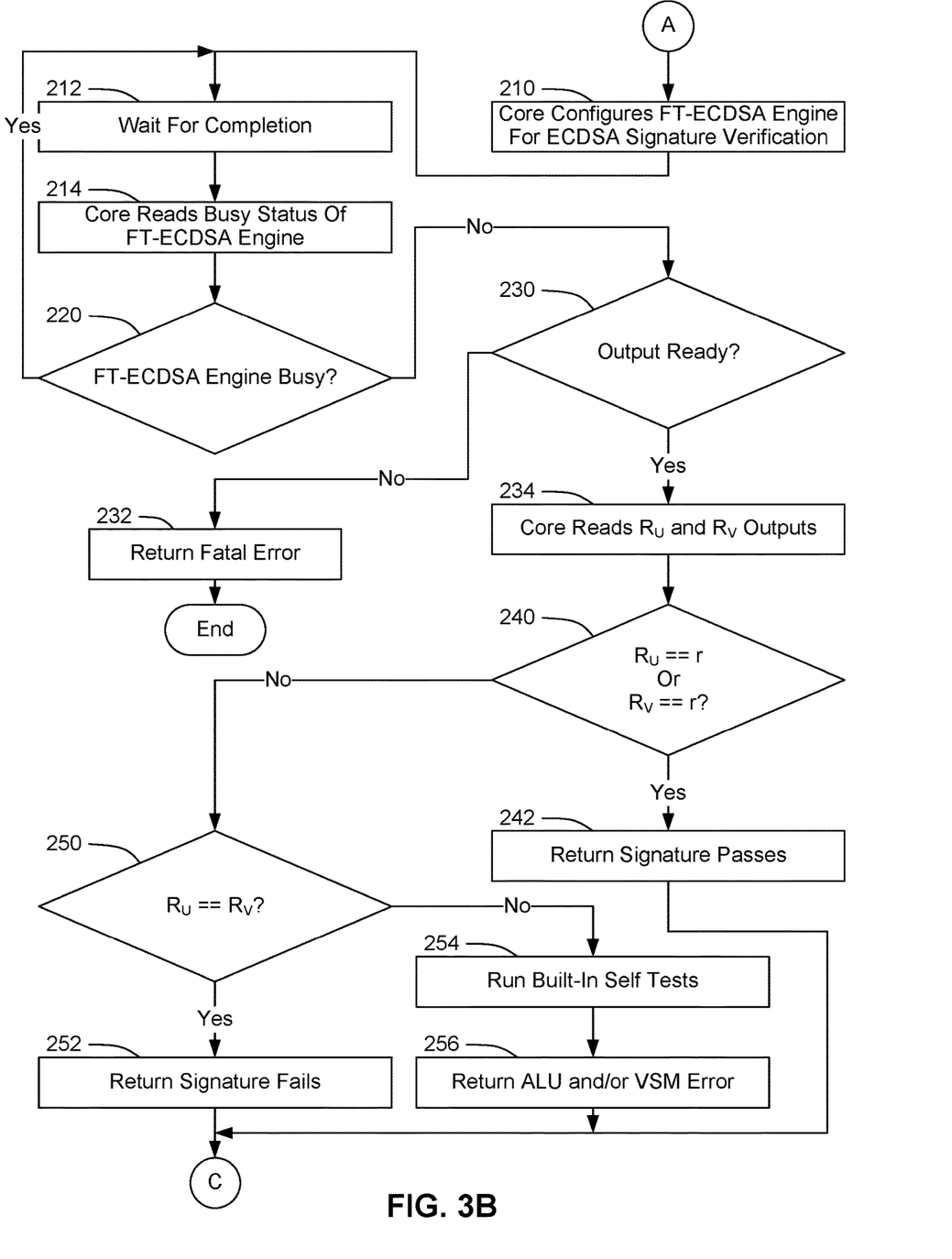
Figure 3C:
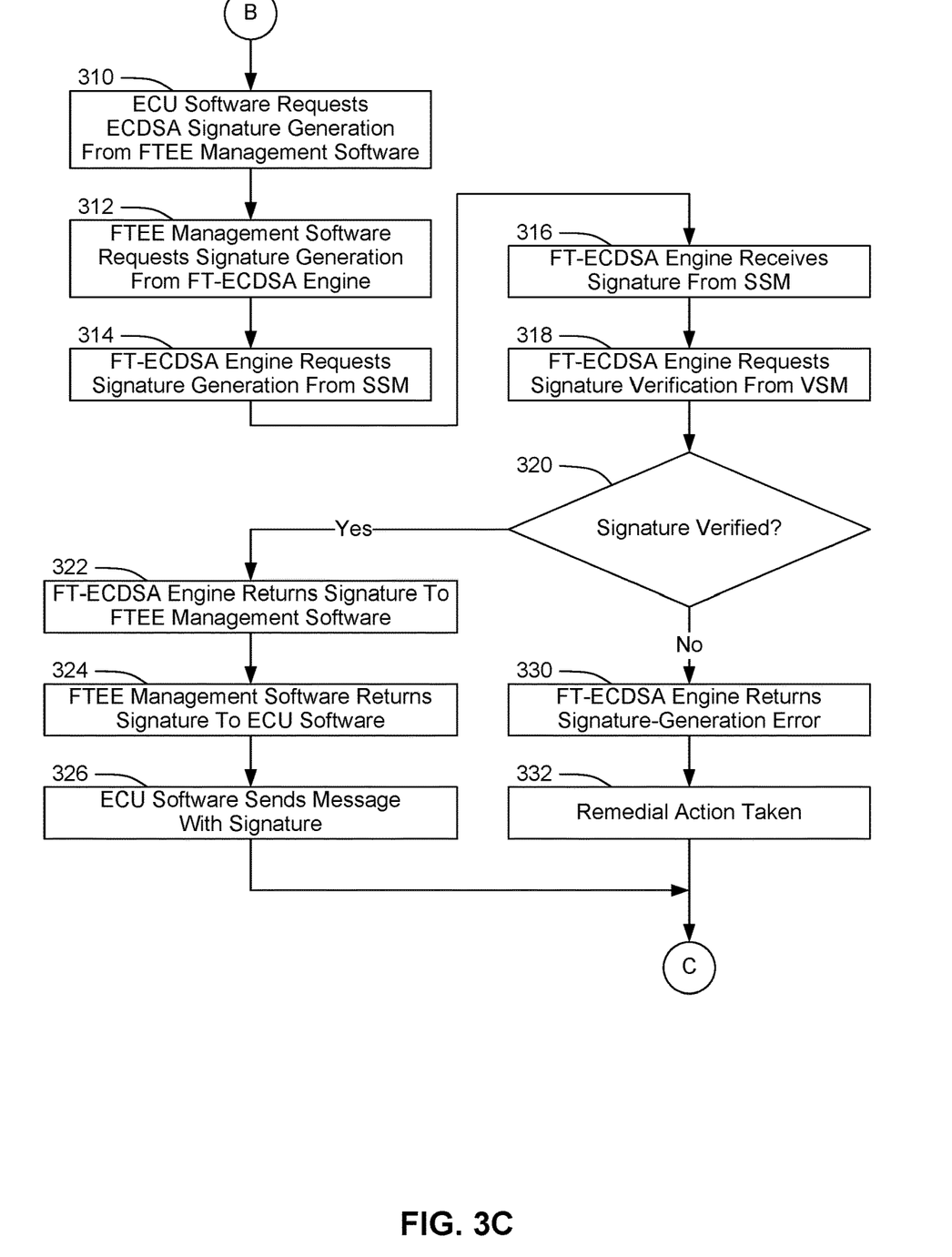

FIGS. 3A-3C present a flowchart of an example embodiment of a process for detecting and tolerating faults in an ECDSA engine, with FIG. 3B focused primarily on signature verification and FIG. 3C focused primarily on signature generation. The process of FIG. 3A may start with node 27 being powered on or reset. In response, as shown at block 110, ECU 28 may load ECU software 32 into RAM and core 40 may begin executing ECU software 32. As shown at block 112, ECU software 32 may then launch FTEE management software 34 on core 40.

As shown at block 114, FTEE management software 34 may then use ALU KAT BISTU 62 to test FF ALU 60 for faults. For instance, FTEE management software 34 may wait until a busy indicator line (e.g., FTEE_Busy) indicates that FT-ECDSA engine 50 is not busy, and FTEE management software 34 may then send a Test_ALU instruction to FT-ECDSA engine 50 via an instruction line (e.g., FTEE-_Inst). In response, FT-ECDSA engine 50 may invoke ALU KAT BISTU 62, and ALU KAT BISTU 62 may then test some or all of the different electronic circuits in FF ALU 60. For instance, ALU KAT BISTU 62 may run predetermined input values through each of those circuits and then determine whether the resulting output matches the predetermined (or known) correct answers. In addition, FTEE management software 34 and/or ALU KAT BISTU 62 may run multiple tests on any circuit that has a fault, to determine whether the fault is a short transient fault, a long transient fault, or a permanent fault.

As shown at block 116, FTEE management software 34 may then use S/V KAT BISTU 58 to test sign/verify unit 56 for faults. For instance, FTEE management software 34 may wait until a busy indicator line (e.g., FTEE_Busy) indicates that FT-ECDSA engine 50 is not busy, and FTEE management software 34 may then send a Test_VS instruction to FT-ECDSA engine 50 via an instruction line (e.g., FTEE-_Inst). In response, FT-ECDSA engine 50 may invoke S/V KAT BISTU 58, and S/V KAT BISTU 58 may then test some or all of the components of sign/verify unit 56. For instance, S/V KAT BISTU 58 may send a predetermined message or message digest to SSM 70 and then determine whether the resulting signature matches the predetermined (or known) correct signature. S/V KAT BISTU 58 may also send a predetermined signature to VSM 80 and VSM 90 and then determine whether the resulting outputs (e.g., $R_U$ and $R_V$, respectively) match the predetermined correct result. In addition, FTEE management software 34 and/or S/V KAT BISTU 58 may run multiple tests on any state machine that has a fault, to determine whether the fault is a short transient fault, a long transient fault, or a permanent fault.

As shown at block 120, FTEE management software 34 may then determine whether the tests detected a fatal fault. For instance, if the tests revealed a permanent fault in a component of FF ALU 60 that is needed for all signing and verification state machines, FTEE management software 34 may conclude that there is a fatal fault. In response, as shown at block 122, FTEE management software 34 may report a fatal fault to ECU software 32. ECU software may then take any suitable remedial action (e.g., logging the error, resetting node 27, etc.) and the process may then end. However, if no fatal fault was detected, FTEE management software 34 may determine whether a transient fault was detected, as shown at block 130. In response, as shown at block 132, FTEE management software 34 may report a transient fault to ECU software 32.

In one embodiment, FTEE management software 34 determines whether faults have been detected, and the nature or type of any such fault, based on test results obtained from ALU KAT BISTU 62 and S/V KAT BISTU 58 via an output line of FT-ECDSA engine 50. Also, the fault report that FTEE management software 34 generates in response to determining that a fault has been detected may identify the component that has the fault and the nature of the fault (e.g., whether the fault is a short transient fault, a long transient fault, or a permanent fault).

FTEE management software 34 or ECU software 32 may then determine whether it is time to run another set of tests, as shown at block 140. For instance, node 27 may run the tests periodically, according to a predetermined time interval. If it is time to run another set of tests, the process may return to block 114, and FTEE management software 34 may again perform the testing operations described above. However, if it is not yet time for another set of tests, FTEE management software 34 or ECU software 32 may determine whether node 27 has received a digitally signed message, as shown at block 150. If a message has not been received, FTEE management software 34 or ECU software 32 may determine whether ECU software 32 has a new message to be sent, as shown at block 160. If there is no new message to be sent, the process may return to block 140, with ECU software 32 or FTEE management software 34 continuing to monitor for the next time to periodically test FT-ECDSA engine 50 and for new incoming and outgoing message.

However, referring again to block 150, if node 27 has received a new message, the process may pass through page connector A to FIG. 3B. ECU software 32 may then use FTEE management software 34 to verify the ECDSA signature from that message. That process may start with FTEE management software 34 configuring FT-ECDSA engine 50 for signature verification, as shown at block 210. For instance, referring again to FIG. 2, FTEE management software 34 may wait for a particular output line or register (e.g., the FTEE_Busy) line to indicate that FT-ECDSA engine 50 is not busy, and then FTEE management software 34 may write a Verify_Signature instruction on the Inst_In line, and FTEE management software 34 may provide other related input values to FT-ECDSA engine 50. For instance, FTEE management software 34 may write the signature to be verified and other input parameters to the Data_In line and/or to other input lines or mechanisms. The input parameters may include, for instance, the public key of the sender/signer, data to identify the elliptic curve to be used, etc. FTEE management software 34 may then signal FT-ECDSA engine 50 to start (e.g., using the FTEE_Start line).

In response, FT-ECDSA engine 50 may change the FTEE_Busy line to show that FT-ECDSA engine 50 us busy, and FT-ECDSA engine 50 may process the Verify_Signature instruction. As shown at block 212, FTEE management software 34 may then wait for FT-ECDSA engine 50 to produce results. For instance, as shown at blocks 214 and 220, FTEE management software 34 may monitor the FTEE_Busy to determine when FT-ECDSA engine 50 has finished processing the Verify_Signature instruction.

To process the Verify_Signature instruction, FT-ECDSA engine 50 may use both VSM 80 and VSM 90 to perform redundant verification of the given signature. However, as indicated above, the set of processing resources that VMS 80 uses to verify signatures is different from the set of processing resources that VSM 90 uses. For example, in one embodiment, the circuitry of VSM 80 is configured to implement one algorithm for verifying signatures, and the circuitry of VSM 90 is configured to implement a different algorithm for verifying signatures. In addition, as indicated above, in one embodiment, VMS 80 uses at least one module of FF ALU 60 that VMS 90 does not use, and VMS 90 uses at least one module of FF ALU 60 that VMS 80 does not use.

In general, both VMS 80 and VMS 90 may accomplish the following major types of operations:

$w = s^{-1} \pmod{n}$.     1.

$u = z*w \pmod{n}$.     2.

$v = r*w \pmod{n}$.     3.

$(x_1, y_1) = [u]G + [v]Q$.     4.

In the above description, r and s are the given signature values, and the following symbols have the following meanings:

z=the $L_n$ leftmost bits of e, where e=HASH(m).
G=the given elliptic curve base point.
n=the given integer order of G.
Q=the public key of the sender/signer.
* denotes multiplication.

square brackets around a scalar, followed immediately by a point (e.g., "[u]G") denotes elliptic curve point multiplication by a scalar.

FTEE management software 34 may then use $x_1$ to determine whether the signature is valid (e.g., if $r = x_1 \pmod{n}$ then signature (r, s) is valid; otherwise invalid). However, VMS 80 and VMS 90 may accomplish those results using different circuits which implement different algorithms.

In particular, in one embodiment, the circuitry of VMS 80 implements the following algorithm (which is also represented in FIG. 2 as states U1 through U6):

$w = s^{-1} \pmod{n}$.     U1.

$u = z*w \pmod{n}$.     U2.

$T_1 = [u]G$.     U3.

$v = r*w \pmod{n}$.     U4.

$T_2 = [v]Q$.     U5.

$(x_1, y_1) = T_1 + T_2$.     U6.

For states U3 and U5, VMS 80 uses FF ALU 60 to perform elliptic curve point multiplication by a scalar using the simple double-and-add left-to-right binary method. For instance, VMS 80 may use a "ScalarMultiply" instruction which causes FF ALU 60 to execute an algorithm such as the following:

Input: $u, G; (u = [u_{m-1}, \ldots, u_0])$

Output: $[u]G$

1. R=0;
2. For i=m−1 down to 0
2.1. R=2R
2.2. If ($u_i$==1) then
2.2.1. R=R+G
3. Return R In other words, VMS 80 may invoke circuitry in FF ALU 60 that implements the above "ScalarMultiply Algorithm." That circuitry may include the multiplier and the adder/subtractor, for example.

By contrast, the circuitry of VMS 90 implements the following algorithm (which is also represented in FIG. 2 as states V1 through V5):

$w = s^{-1} \pmod{n}$.     V1.

$u = z*w \pmod{n}$.     V2.

$T = G + Q$.     V3.

$v = r*w \pmod{n}$.tm V4.

$(x_1, y_1) = \text{MultiScalarMult}(u, G, Q, T)$.     V5.

For state V5, VMS 90 uses FF ALU 60 to perform multi-scalar multiplication. For purposes of this disclosure, "multi-scalar multiplication" denotes a process for computing a point on an elliptic curve, according to the following "MultiScalarMult" algorithm (or a similar algorithm):

Input: $u, G, v, Q, T; (u = [u_{m-1}, \ldots, u_0]), (v = [v_{m-1}, \ldots, v_0])$ Output: $[u]G + [v]Q$ 1. For j=m−1 down to 0
2. A. If ($u_j$==1 and $v_j$==1) then R=T; break;
   B. Else if ($u_j$==1 and $v_j$==0) then R=G; break;
   C. Else if ($u_j$==0 and $v_j$==1) then R=Q; break;

3. For i=j−1 down to 0
3.1. R=[2]R
3.2. A. If ($u_i$==1 and $v_i$==1) then R=R+T
    B. Else if ($u_i$==1 and $v_i$==0) then R=R+G
    C. Else if ($u_i$==0 and $v_i$==1) then R=R+Q
4. Return R In other words, VMS 90 may use a "MultiScalarMult" instruction to invoke circuitry in FF ALU 60 that implements the above "MultiScalarMult Algorithm" to compute [u]G+[v]Q, where u and v are integers, and G and Q are points on an elliptic curve. That circuitry may include the multiplier and the adder/subtractor, for example.

After each VSM has computed "R" or "($x_1$, $y_1$)", each VM may then write its output (e.g., $x_1$) to one of registers 54. For instance, VSM 80 may write its $x_1$ to register $R_U$, and VSM 90 may write its $x_1$ to register $R_V$. And due to the different state machines and such used by VSM 80 and VSM 90, if there is (or was) a long transient fault (or a short transient fault) inside the multiplier, the adder/subtractor, or the MUX/DMUX path, then the final output (e.g., $x_1$ or ($x_1$, $y_1$)) from each VSM will likely be different.

FT-ECDSA engine 50 may then change the FTEE_Busy and Data_Out_Valid output lines to indicate that execution is complete and output is ready. As shown at blocks 220 and 230 of FIG. 3B, if the FTEE_Busy line indicates that execution is complete, but the Data_Out_Valid line does not indicate that output is ready, FTEE management software 34 may return a fatal error, as shown at block 232. However, as shown at block 234, if FT-ECDSA engine 50 is no longer busy and it has output ready, FTEE management software 34 may read the outputs of VSM 80 and VSM 90 from $R_U$ and $R_V$, respectively.

As shown at block 240, FTEE management software 34 may then determine whether at least one of those values equals r. If either of those values equals r, FTEE management software 34 returns output to ECU software 32 indicating that the signature has passed verification, as shown at block 242. However, if neither $R_U$ nor $R_V$ equals r, FTEE management software 34 may determine whether $R_U$ equals $R_V$, as shown at block 250. Thus, FTEE management software 34 determines whether VSM 80 and VSM 90 both generated the same $x_1$, but that $x_1$ does not equal r. In response to such a condition, FTEE management software 34 returns output to ECU software 32 indicating that the signature has failed verification, as shown at block 252.

However, as shown at block 254, if VSM 80 and VSM 90 generated different values for $x_1$, FTEE management software 34 causes FT-ECDSA engine 50 to run one or more self-test rounds. For instance, FT-ECDSA engine 50 may use ALU KAT BISTU 62 to test FF ALU 60, and FT-ECDSA engine 50 may use S/V KAT BISTU 58 to test SSM 70, VSM 80, and VSM 90. If none of the modules fails its test, FTEE management software 34 may conclude that there was a short transient fault. And if any module fails its test, FT-ECDSA engine 50 may repeat the test on that module one or more times, to determine whether the fault is a long transient fault or a permanent fault. As shown at block 256, FTEE management software 34 may then return an error report to ECU software 32 to identify the type of fault and the faulty component, if known.

In addition, FTEE management software 34 may also check whether VSM 80 and VSM 90 generated the same result when at least one of those results equals r, and if they did not generate the same result, FTEE management software 34 may cause FT-ECDSA engine 50 to run one or more self-test rounds, as indicated above.

The process may then return to FIG. 3A via page connector C. ECU software 32 may then wait until it is time for another test or until there is a new signature to verify (for a message that has been received) or to generate (for a message to be sent), as indicated above.

As shown at block 160, if ECU software 32 has a new message to be sent, the process may pass through page connector B to FIG. 3C. As shown at blocks 310 and 312 of FIG. 3C, if ECU software 32 is preparing to send a new message, ECU software 32 may request a signature for that message from FTEE management software 34, and in response, FTEE management software 34 may request the signature from FT-ECDSA engine 50. For instance, FTEE management software 34 may wait until FT-ECDSA engine 50 is not busy, and then FTEE management software 34 may write a GenerateSignature instruction to the FTEE_Inst line. FTEE management software 34 may also provide other related input values to FT-ECDSA engine 50 via the Data_In line and/or other input lines or mechanisms. Those input parameters may include, for instance, the message m or message digest e, the private key $d_A$, identification of the specific elliptic curve to be used, etc. FTEE management software 34 may then use the FTEE_Start line, for instance, to signal FT-ECDSA engine 50 to start signature generation.

As shown at block 314, FT-ECDSA engine 50 may then request signature generation from SSM 70. In response, SSM 70 may generate the signature, based on the input data. As shown at block 316, FT-ECDSA engine 50 may then receive the signature as output from SSM 70. As shown at block 318, FT-ECDSA engine 50 may then request signature verification from VSM 80 and VSM 90. Alternatively, FT-ECDSA engine 50 may return the signature to FTEE management software 34, and FTEE management software 34 may request signature verification from FT-ECDSA engine 50. In either case, FT-ECDSA engine 50 may then use VSM 80 and VSM 90 to verify the signature, as described above with regard to FIG. 3B.

As shown at block 320, FTEE management software 34 then determines whether the signature passed verification or validation. If the signature passed verification, FT-ECDSA engine 50 returns the signature to FTEE management software 34, and FTEE management software 34 returns the signature to ECU software 32, as shown at blocks 322 and 324. As shown at block 326, ECU software 32 may then send the message with the signature.

However, if the signature fails verification, FT-ECDSA engine 50 returns a signature generation error, as shown at block 330. In response, FTEE management software 34 and/or ECU software 32 may then take remedial action, as shown at block 332. For instance, FTEE management software 34 may submit another request for signature generation to FT-ECDSA engine 50.

The process may then return to FIG. 3A via page connector C. As indicated above, node 27 may then continue to generate and verify messages and to periodically test FT-ECDSA engine 50 for faults.

As has been described, the present disclosure describes technology to provide fault tolerance for ECDSA engines. That technology may also provide for fault detection. For example, as indicated above, FTEE management software may use KAT BISTUs when an error is detected during ECDSA signature verification to pinpoint the location of the error, and the FTEE management software may run tests repeatedly for a faulty arithmetic datapath to determine whether the fault is a permanent fault. The FTEE management software may also periodically test the signing module and the verification modules to ensure that the hardware is available and functioning without error.

In one embodiment, the technology described herein involves DMR for the verification module and execution time for signature verification similar to double temporal redundancy (DTR). Consequently, the technology described herein may be implemented with about 1.3 times area overhead and about 2 times latency overhead, compared to a conventional system without modular or temporal redundancy. And the technology described herein may protect against permanent faults, short transient faults, and long transient faults. Furthermore, the technology described herein may protect against faults in many different locations or modules, including multiplier, adder/subtractor, state machine, registers, input ports, output ports, reset line, and clock tree.

In one embodiment, the technology described herein may be used to enable a driving assistance system to achieve a particular degree of reliability, such as Automotive Safety Integrity Level (ASIL) D. Other embodiments may provide reliability in other fields of use, such as nuclear power generation, aerospace, etc.

Although certain example embodiments are described herein, one of ordinary skill in the art will understand that those example embodiments may easily be divided, combined, or otherwise altered to implement additional embodiments. In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from such principles.

Also, as described above, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Any suitable operating environment and programming language (or combination of operating environments and programming languages) may be used to implement software components described herein.

A medium which contains data and which allows another component to obtain that data may be referred to as a machine-accessible medium or a machine-readable medium.

In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Accordingly, alternative embodiments include machine-readable media containing instructions for performing the operations described herein. Such media may be referred to in general as apparatus and in particular as program products. Such media may include, without limitation, tangible non-transitory storage components such as magnetic disks, optical disks, dynamic RAM, static RAM, read-only memory (ROM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.).

Additionally, the present teachings may be used to advantage in many different kinds of data processing systems. Such data processing systems may include, without limitation, accelerators, systems on a chip (SOCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered. Embodiments of technology to provide fault tolerance for ECDSA engines include the following examples:

Example A1 is an ECU with technology for detecting and tolerating faults. The ECU comprises a processing core, nonvolatile storage in communication with the processing core, and a fault-tolerant ECDSA engine in communication with the processing core. The fault-tolerant ECDSA engine comprises multiple verification state machines (VSMs) to verify digital signatures. The multiple VSMs comprise a first VSM and a second VSM. The ECU also comprises a known-answer built-in self-test unit (KA-BISTU) in communication with the fault-tolerant ECDSA engine, and fault-tolerant ECDSA engine (FTEE) management software in the nonvolatile storage, wherein the FTEE management software, when executed by the processing core, utilizes the KA-BISTU to periodically test the fault-tolerant ECDSA engine for faults.

Example A2 is an ECU according to Example A1, wherein the ECU further comprises a finite field (FF) ALU in the fault-tolerant ECDSA engine. Also, the KA-BISTU comprises an FF ALU self-test unit. Also, the FTEE management software, when executed by the processing core, utilizes the FF ALU self-test unit to periodically test the FF ALU for faults.

Example A3 is an ECU according to Example A1, wherein the ECU comprises only one FF ALU. Example A3 may also include the features of Example A2.

Example A4 is an ECU according to Example A1, wherein the KA-BISTU comprises an ALU self-test unit, and the ECU further comprises a sign/verify (S/V) self-test unit in communication with the multiple VSMs. Also, the FTEE management software, when executed by the processing core, utilizes the S/V self-test unit to periodically test the VSMs for faults. Example A4 may also include the features of any one or more of Examples A2 through A3.

Example A5 is an ECU according to Example A4, wherein the ECU further comprises a signing state machine (SSM) in communication with the processing core, and wherein the FTEE management software, when executed by the processing core, utilizes the S/V self-test unit to periodically test the SSM for faults.

Example A6 is an ECU according to Example A4, wherein the FTEE management software, when executed by the processing core (a) automatically determines whether the first and second VSMs have both generated erroneous results when attempting to verify a digital signature, and (b) utilizes the S/V self-test unit to automatically test the first and second VSMs for faults, in response to determining that the first and second VSMs have both generated erroneous results when attempting to verify the digital signature. Example A6 may also include the features of Example A5.

Example A7 is an ECU according to Example A1, wherein the ECU further comprises a signing state machine (SSM) in communication with the processing core. Also, the FTEE management software, when executed by the processing core (a) utilizes the SSM to generate a digital signature, and (b) in response to generation of the digital signature by the SSM, automatically utilizes the multiple VSMs to verify that the SSM generated the digital signature properly. Example A7 may also include the features of any one or more of Examples A2 through A6.

Example A8 is an ECU according to Example A1, wherein (a) the first VSM comprises a first electronic circuit configured to verify digital signatures, (b) the second VSM comprises a second electronic circuit configured to verify digital signatures, and (c) the first electronic circuit has a significantly different configuration from the second electronic circuit. Also, the FTEE management software, when executed by the processing core, (a) utilizes both the first VSM and the second VSM to verify a digital signature, (b) causes the first and second VSMs to operate simultaneously when verifying the digital signature, and (c) accepts the digital signature as valid if at least one of the first and second VSMs determines that the digital signature is valid. Example A8 may also include the features of any one or more of Examples A2 through A7.

Example B1 is a data processing system with technology for detecting and tolerating faults. The data processing system comprises an ECU comprising a processing core and a fault-tolerant ECDSA engine in communication with the processing core. The fault-tolerant ECDSA engine comprises multiple verification state machines (VSMs) to verify digital signatures. The data processing system further comprises nonvolatile storage in communication with the processing core and ECU software in the nonvolatile storage. The ECU software, when executed by the processing core, enables the data processing system to operate as a node in a distributed data processing system, wherein operating as a node comprises receiving digitally signed messages from other nodes in the distributed data processing system. Also, the ECU further comprises a known-answer built-in self-test unit (KA-BISTU). Also, the ECU software comprises fault-tolerant ECDSA engine (FTEE) management software which, when executed by the processing core, utilizes the KA-BISTU to periodically test the fault-tolerant ECDSA engine for faults.

Example B2 is a data processing system according to Example B1, wherein the fault-tolerant ECDSA engine further comprises a finite field (FF) ALU; the KA-BISTU comprises an FF ALU self-test unit; and the FTEE management software, when executed by the processing core, utilizes the FF ALU self-test unit to periodically test the FF ALU for faults.

Example B3 is a data processing system according to Example B3, wherein the ECU further comprises a sign/verify (S/V) self-test unit in communication with the multiple VSMs; and the FTEE management software, when executed by the processing core, utilizes the S/V self-test unit to periodically test the VSMs for faults.

Example B4 is a data processing system according to Example B1, wherein the multiple VSMs comprise a first VSM comprising a first electronic circuit configured to verify digital signatures, and a second VSM comprising a second electronic circuit configured to verify digital signatures. Also, the first electronic circuit has a significantly different configuration from the second electronic circuit. Also, the FTEE management software, when executed by the processing core (a) utilizes both the first and second VSMs to verify a digital signature, (b) causes the first and second VSMs to operate simultaneously when verifying the digital signature, and (c) accepts the digital signature as valid if at least one of the first and second VSMs determines that the digital signature is valid. Example B4 may also include the features of any one or more of Examples B2 through B3.

Example C1 is a method for detecting and tolerating faults in an ECU. The method comprising automatically utilizing multiple verification state machines (VSMs) in a fault-tolerant elliptic curve digital signature algorithm (ECDSA) engine in the ECU to verify a digital signature, and automatically utilizing a known-answer built-in self-test unit (KA-BISTU) in the ECU to periodically test the fault-tolerant ECDSA engine for faults.

Example C2 is a method according to Example C1, wherein the operation of automatically utilizing the KA-BISTU to periodically test the fault-tolerant ECDSA engine for faults comprises automatically utilizing the KA-BISTU to periodically test a finite field (FF) ALU in the fault-tolerant ECDSA engine for faults.

Example C3 is a method according to Example C1, wherein the ECU comprises only one FF ALU. Example C3 may also include the features of Example C2.

Example C4 is a method according to Example C1, wherein the KA-BISTU comprises an ALU self-test unit. Also, the method further comprises automatically utilizing a sign/verify (S/V) self-test unit in the ECU to periodically test the VSMs for faults. Example C4 may also include the features of any one or more of Examples C2 through C3.

Example C5 is a method according to Example C4, wherein the method further comprises automatically utilizing the S/V self-test unit to periodically test a signing state machine (SSM) in the ECU for faults.

Example C6 is a method according to Example C4, wherein the VSMs comprise first and second VSMs. Also, the method further comprises (a) automatically determining whether the first and second VSMs have both generated erroneous results when attempting to verify the digital signature, and (b) utilizing the S/V self-test unit to automatically test the first and second VSMs for faults, in response to determining that the first and second VSMs have both generated erroneous results when attempting to verify the digital signature. Example C6 may also include the features of Example C5.

Example C7 is a method according to Example C1, wherein the method further comprises utilizing a signing state machine (SSM) in the ECU to generate a digital signature, and in response to generation of the digital signature by the SSM, automatically utilizing the multiple VSMs to verify that the SSM generated the digital signature properly. Example C7 may also include the features of any one or more of Examples C2 through C6.

Example C8 is a method according to Example C1, wherein the operation of automatically utilizing multiple VSMs to verify a digital signature comprises using both a first VSM and a second VSM to verify the digital signature, wherein (a) the first VSM has a significantly different configuration from the second VSM, and (b) the first and second VSMs operate simultaneously when verifying the digital signature. The method further comprises automatically accepting the digital signature as valid if at least one of the first and second VSMs determines that the digital signature is valid. Example C8 may also include the features of any one or more of Examples C2 through C7.

In view of the wide variety of useful permutations that may be readily derived from the example embodiments described herein, this detailed description is intended to be illustrative only, and should not be taken as limiting the scope of coverage.

What is claimed is:

1. An apparatus comprising:
   processor circuitry coupled to memory, the processor circuitry to detect and tolerate faults, the processor circuitry to:
   facilitate a self-test unit circuitry to periodically test a fault-tolerant engine circuitry associated with multiple verification state machines (VSMs) to verify digital signatures;
   facilitate a signing state machine (SSM) to generate a digital signature of the digital signatures; and
   in response to generation of the digital signature, automatically trigger the VSMs to verify the digital signature.

2. The apparatus of claim 1, wherein the fault-tolerant engine circuitry includes a fault-tolerant elliptic curve digital signature algorithm (ECDSA) engine circuitry, wherein the self-test unit circuitry includes a known-answer built-in self-test unit (KA-BISTU) circuitry.

3. The apparatus of claim 1, wherein the VSMs includes a first VSM and a second VSM in communication with a sign/verify (S/V) circuitry, and wherein processor circuitry is further to facilitate the S/V self-test circuitry to periodically test the VSMs for the faults, or periodically test the SSM for the faults.

4. The apparatus of claim 1, wherein the processor circuitry is further to:
automatically determine whether the first VSM and the second VSM have generated erroneous results when attempting to verify the digital signature; and
in response to erroneous results, trigger the self-test unit circuitry to automatically test the first VSM and the second VSM for the faults.

5. The apparatus of claim 1, wherein:
the first VSM comprises a first electronic circuit configured to verify the digital signatures; and
the second VSM comprises a second electronic circuit configured to verify the digital signatures, wherein the second electronic circuit has a significantly different configuration from the first electronic circuit; and
wherein the processor circuitry is further to:
utilize the first VSM and the second VSM to verify the digital signature;
cause the first VSM and the second VSM to operate simultaneously when verifying the digital signature; and
accept the digital signature as valid if at least one of the first VSM and the second VSM determines that the digital signature is valid.

6. A method comprising:
facilitating, by a processor circuitry of a computing device, a self-test unit circuitry to periodically test a fault-tolerant engine circuitry associated with multiple verification state machines (VSMs) to verify digital signatures, wherein the processor circuitry to detect and tolerate faults;
facilitating, by the processor circuitry, a signing state machine (SSM) to generate a digital signature of the digital signatures; and
in response to generation of the digital signature, automatically triggering, by the processor circuitry, the VSMs to verify the digital signature.

7. The method of claim 6, wherein the fault-tolerant engine circuitry includes a fault-tolerant elliptic curve digital signature algorithm (ECDSA) engine circuitry, wherein the self-test circuitry includes a known-answer built-in self-test unit (KA-BISTU) circuitry.

8. The method of claim 6, wherein the VSMs includes a first VSM and a second VSM in communication with a sign/verify (S/V) circuitry, and wherein the method further includes facilitating, by the processor circuitry, the S/V self-test circuitry to periodically test the VSMs for the faults, or periodically test the SSM for the faults.

9. The method of claim 8, further comprising:
automatically determining, by the processor circuitry, whether the first VSM and the second VSM have generated erroneous results when attempting to verify the digital signature; and
in response to erroneous results, triggering, by the processor circuitry, the self-test unit circuitry to automatically test the first VSM and the second VSM for the faults.

10. The method of claim 8, wherein:
the first VSM comprises a first electronic circuit configured to verify the digital signatures; and
the second VSM comprises a second electronic circuit configured to verify the digital signatures, wherein the second electronic circuit has a significantly different configuration from the first electronic circuit; and
wherein the method further comprises:
utilizing, by the processor circuitry, the first VSM and the second VSM to verify the digital signature;
causing, by the processor circuitry, the first VSM and the second VSM to operate simultaneously when verifying the digital signature; and
accepting, by the processor circuitry, the digital signature as valid if at least one of the first VSM and the second VSM determines that the digital signature is valid.

11. At least one non-transitory computer-readable medium having stored thereon instructions which, when executed, causes a computing device to perform operations comprising:
facilitating a self-test circuitry to periodically test a fault-tolerant engine circuitry associated with multiple verification state machines (VSMs) to verify digital signatures, wherein the processor circuitry to detect and tolerate faults;
facilitating a signing state machine (SSM) to generate a digital signature of the digital signatures; and
in response to generation of the digital signature, automatically triggering the VSMs to verify the digital signature.

12. The non-transitory computer-readable medium of claim 11, wherein the fault-tolerant engine circuitry includes a fault-tolerant elliptic curve digital signature algorithm (ECDSA) engine circuitry, wherein the self-test unit circuitry includes a known-answer built-in self-test unit (KA-BISTU) circuitry.

13. The non-transitory computer-readable medium of claim 11, wherein the VSMs includes a first VSM and a second VSM in communication with a sign/verify (S/V) circuitry, and wherein the operations further comprise facilitating the S/V self-test circuitry to periodically test the VSMs for the faults, or periodically test the SSM for the faults.

14. The non-transitory computer-readable medium of claim 13, wherein the operations further comprise:
automatically determining whether the first VSM and the second VSM have generated erroneous results when attempting to verify the digital signature; and
in response to erroneous results, triggering the self-test unit circuitry to automatically test the first VSM and the second VSM for the faults.

15. The non-transitory computer-readable medium of claim 13, wherein:
the first VSM comprises a first electronic circuit configured to verify the digital signatures; and
the second VSM comprises a second electronic circuit configured to verify the digital signatures, wherein the second electronic circuit has a significantly different configuration from the first electronic circuit; and
wherein the operations further comprise:
utilizing the first VSM and the second VSM to verify the digital signature;
causing the first VSM and the second VSM to operate simultaneously when verifying the digital signature; and
accepting the digital signature as valid if at least one of the first VSM and the second VSM determines that the digital signature is valid.

* * * * *